G. SANFORD.
Mechanical Movement.
No. 198,416. Patented Dec. 18, 1877.
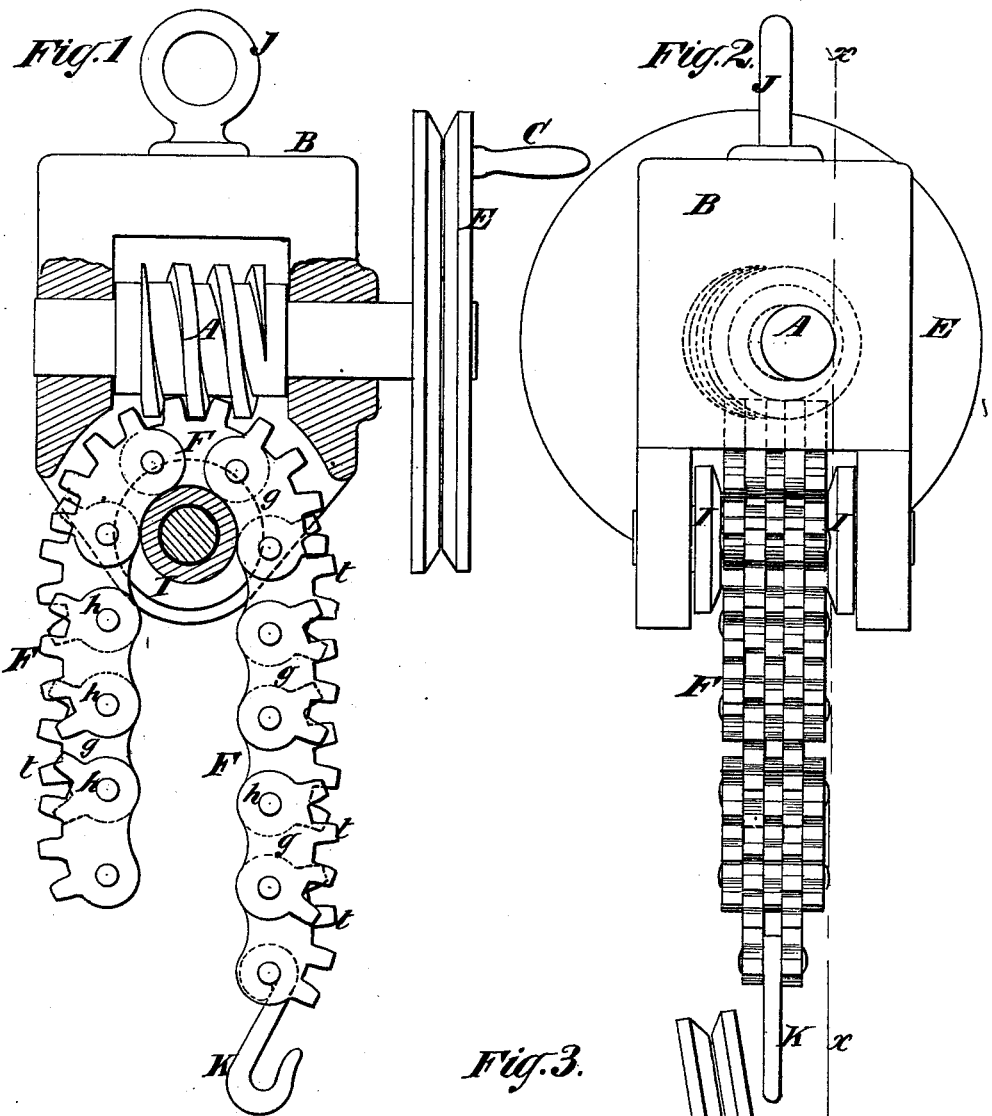
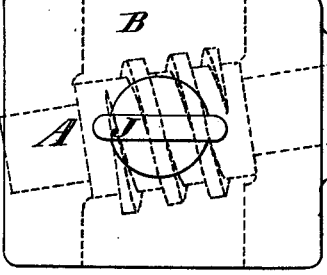

United States Patent Office.

GELSTON SANFORD, OF BROOKLYN, NEW YORK.

IMPROVEMENT IN MECHANICAL MOVEMENTS.

Specification forming part of Letters Patent No. 198,416, dated December 18, 1877; application filed November 15, 1877.

*To all whom it may concern:*

Be it known that I, GELSTON SANFORD, of Brooklyn, in the county of Kings and State of New York, have invented a novel Mechanical Movement; and I do hereby declare that the following is a full, clear, and exact description of the same, reference being had to the accompanying drawing, forming part of this specification.

My invention enables me to convert a rotary motion about one axis into rectilinear motion, into circular motion around another axis inclined to or at right angles with the first axis of rotation, or into motion of a material point or points through any prescribed curve.

The invention consists in a flexible rack, operated by a screw in the manner hereinafter described.

The invention is applicable to a great variety of useful purposes, among the more important of which are the construction of hoisting apparatus, feed-motions for lathes and other machine tools, apparatus for steering vessels, &c.

The invention will, however, be sufficiently illustrated by describing it as applied to apparatus for hoisting.

Figure 1 in the drawing is a section of such hoisting apparatus made on the line $x\, x$ in Fig. 2. Fig. 2 is a side view, and Fig. 3 a plan view, of such an apparatus.

A represents an endless screw, which has its bearings in the suspending-block B, and which may be turned either by a winch, C, by a grooved pulley, E, and an endless band, or by gearing.

The thread of said screw engages the teeth of the flexible rack F, which, for many purposes, may be made endless by uniting its free ends.

The teeth $t$ of this flexible rack may have a regular pitch corresponding to the pitch of the screw; but it is preferred, instead of giving pitch to said teeth, to incline the axis of the screw to the central plane of the path in which the flexible rack is desired to travel, as shown in Fig. 3, which, producing the same effect, enables me to make the said flexible rack of similar pieces $g$ throughout its entire extent, said pieces being preferably punched from metal and jointed together by pivots $h$.

The block B, which supports the screw-bearings, also supports the roller or pulley I, over which the flexible rack F passes. Said block is also provided with a ring, J, for its support. Either or both the ends of the said flexible rack may be supplied with hooks for attachment of bodies to be hoisted.

It will be obvious, according to the principle of "virtual velocities," that if the hook K be engaged with a loop or eye placed in the lower part of the block B, and a pulley be placed in the so-formed bight or loop of the flexible rack, the purchase of the apparatus may be doubled.

It will also be obvious that, if the flexible rack be made to run in a guiding groove or way, motion in any curve may be produced by the action of the endless screw and flexible rack.

I claim—

The new mechanical movement, consisting in the combination of the endless screw A and the flexible rack F, substantially as and for the purposes specified.

GELSTON SANFORD.

Witnesses:
FRED. HAYNES,
EDWARD B. SPERRY.